US006803226B2

(12) United States Patent
Suzuki et al.

(10) Patent No.: US 6,803,226 B2
(45) Date of Patent: Oct. 12, 2004

(54) METHOD OF FORMING AN ARTIFICIAL SHIRO OF MATSUTAKE

(75) Inventors: Kazuo Suzuki, Yachiyo (JP); Alexis Guerin-Laguette, Tokyo (JP); Lu-Min Vaario, Helsinki (FI)

(73) Assignee: The University of Tokyo, Tokyo (JP)

( * ) Notice: Subject to any disclaimer, the term of this patent is extended or adjusted under 35 U.S.C. 154(b) by 155 days.

(21) Appl. No.: 10/053,549

(22) Filed: Jan. 24, 2002

(65) Prior Publication Data

US 2002/0142450 A1 Oct. 3, 2002

(30) Foreign Application Priority Data

Jan. 26, 2001 (JP) ........................................ 2001-018691

(51) Int. Cl.$^7$ ................................................ A01G 1/04
(52) U.S. Cl. ................................ 435/256.8; 435/254.1; 47/1.1
(58) Field of Search ........................... 435/256.8, 254.1; 47/1.1

(56) References Cited

U.S. PATENT DOCUMENTS

| | | | | |
|---|---|---|---|---|
| 4,420,319 A | * | 12/1983 | Holtz | 71/5 |
| 4,421,543 A | * | 12/1983 | Holtz | 71/5 |
| 4,776,872 A | * | 10/1988 | Mulleavy et al. | 71/5 |

FOREIGN PATENT DOCUMENTS

| | | |
|---|---|---|
| JP | 50-3840 | 1/1975 |
| JP | 54-111449 | 8/1979 |
| JP | 54-117747 | 9/1979 |
| JP | 58-56677 | 4/1983 |
| JP | 63-68027 | 3/1988 |
| JP | 9-252648 | 9/1997 |

OTHER PUBLICATIONS

Patent Abstracts of Japan, JP 5–211819, Aug. 24, 1993.
Patent Abstracts of Japan, JP 2–020283, Jan. 23, 1990.
Patent Abstracts of Japan, JP 1–101880, Apr. 19, 1989.
Patent Abstracts of Japan, JP 55–118389, Sep. 11, 1980.
Patent Abstracts of Japan, JP 7–135847, May 30, 1995.
Japanese Office Sep. 1, 2003, w. English Translation.
Forest Microorganism Laboratory Publication, 3pp. "Trial of Artificial Growth of Agaricales".

* cited by examiner

Primary Examiner—Leon B. Lankford, Jr.
(74) Attorney, Agent, or Firm—Oblon, Spivak, McClelland, Maier & Neustadt, P.C.

(57) ABSTRACT

A method of forming an artificial Shiro of Matsutake comprises culturing Matsutake hyphae in a culture substrate containing a substance capable of controlling the cell membrane permeability of the hyphae as an active principle, and a method of forming an artificial Shiro of Matsutake comprises culturing Matsutake hyphae in a culture substrate containing a substance capable of enhancing the hydrophilic property of the hyphae as an active principle.

5 Claims, 1 Drawing Sheet

US 6,803,226 B2

METHOD OF FORMING AN ARTIFICIAL SHIRO OF MATSUTAKE

CROSS-REFERENCE TO RELATED APPLICATIONS

This application is based upon and claims the benefit of priority from the prior Japanese Patent Application No. 2001-018691, filed Jan. 26, 2001, the entire contents of which are incorporated herein by reference.

BACKGROUND OF THE INVENTION

1. Field of the Invention

The present invention relates to a method of forming an artificial Shiro of Tricholoma Matsutake (hereinafter referred to as "Matsutake").

2. Description of the Related Art

Generally, as a method for efficiently cultivating a large amount of mushrooms, a method of proliferating mycelia of the mushroom in a liquid culture medium is known. However, in case of Matsutake mushrooms, their production requires a root of a living tree, because Matsutake is an ectomycorrhizal fungus. An assembly of hyphae called a "Shirow" is present in the site where a Matsutake mushroom grows, and therefore induction of the Shiro formation is an important step toward increasing the production of Matsutake mushrooms (Makoto Ogawa, Biology of Matsutake, pp 333, published by Tsukiji Shokan).

However, in a natural environment, saprobe and sugar fungus preferentially proliferate in the nutrient site where a red pine (i.e., a host plant of a Matsutake fungus) grows. Because of this, it is difficult for a Matsutake fungus (a symbiotic fungus) to form its Shiro.

Various studies have been made on artificial cultivation of Matsutake mushrooms (Tricholoma Matsutake (S. Ito et Imai) Sing.) from long ago. Nevertheless, it is still impossible to cultivate Matsutake mushrooms artificially.

The results of studies that have been made on the artificial cultivation of Matsutake mushrooms will be described below.

Masui has experimentally showed that Matsutake forms a mycorrhizal association with a root of a red pine (Masui, K. (1927), Mem. Coll. Sci. Kyoto Univ. B (2) 2, 149–279). Tominaga has investigated the optimal conditions for growth of Matsutake hyphae (Tominaga, Y. (1965) Bull. Hiroshima Agri. Coll. 2: 242–246). Ogawa et al. have investigated the formation of a Matsutake fruit body primordium by axenic culture (Ogawa, M & Hamada, M (1975), Trans. Mycol. Soc. Japan 16: 406–415). However, success in the induction of Matsutake Shiro formation has not yet been reported.

To make the present invention, the present inventors have focused on the fact that the Matsutake hyphae grow extremely slowly. They considered that the slow growth of the hyphae might be one of the factors that hindered advancements of artificial cultivation of Matsutake mushrooms. Up to now, in an attempt to produce Matsutake mushrooms in a large amount, artificial formation of a new Shiro has been tried by inoculating Matsutake hyphae into a host plant-growing forest. However, by such a trial, Matsutake hyphae have not grown to form a Shiro to the extent of practical use. Therefore, it is presently considered difficult to cultivate Matsutake mushrooms artificially.

BRIEF SUMMARY OF THE INVENTION

In view of the aforementioned background, the present inventors have made extensive studies on a method of inducing the formation of an artificial Shiro of Matsutake, which is an important step toward increasing the production of Matsutake mushrooms. Therefore, an object of the present invention is to provide a method capable of rapidly forming an artificial Shiro of Matsutake.

The present inventors found an active principle capable of promoting the growth of Matsutake hyphae. Based on this finding, they established a method of proliferating Matsutake hyphae in a short time, thereby accomplishing the present invention. More specifically, the present invention is achieved by the means described below.

(1) A method of forming an artificial Shiro of Matsutake comprising:

culturing Matsutake hyphae in a culture substrate containing a substance capable of controlling the cell membrane permeability of the hyphae as an active principle.

(2) A method of forming an artificial Shiro of Matsutake comprising:

culturing Matsutake hyphae in a culture substrate containing a substance capable of enhancing the hydrophilic property of the hyphae as an active principle.

(3) A method of forming an artificial Shiro of Matsutake comprising:

culturing Matsutake hyphae in a culture substrate containing a surfactant and/or a natural vegetable oil as an active principle.

(4) A method of forming an artificial Shiro of Matsutake comprising:

culturing Matsutake hyphae in a culture substrate containing a fatty acid ester as an active principle.

(5) A method of forming an artificial Shiro of Matsutake, comprising:

inducing growth of Matsutake hyphae by aseptically homogenizing a colony of Matsutake hyphae and aseptically culturing the obtained hyphae in a liquid nutrient medium;

preparing an inoculum of Matsutake hyphae by aseptically replacing the liquid nutrient medium containing the growth-induced Matsutake hyphae with a liquid nutrient medium containing no carbon source; and culturing aseptically the inoculum of the Matsutake hyphae in a culture substrate containing a substance capable of controlling the cell membrane permeability of the hyphae as an active principle.

(6) A method of forming an artificial Shiro of Matsutake, comprising:

inducing growth of Matsutake hyphae by aseptically homogenizing a colony of Matsutake hyphae and aseptically culturing the obtained hyphae in a liquid nutrient medium;

preparing an inoculum of Matsutake hyphae by aseptically replacing the liquid nutrient medium containing the growth-induced Matsutake hyphae with a liquid nutrient medium containing no carbon source; and culturing aseptically the inoculum of the Matsutake hyphae in a culture substrate containing a substance capable of enhancing the hydrophilic property of the hyphae as an active principle.

(7) A method of forming an artificial Shiro of Matsutake, comprising:

inducing growth of Matsutake hyphae by aseptically homogenizing a colony of Matsutake hyphae and aseptically culturing the obtained hyphae in a liquid nutrient medium;

preparing an inoculum of Matsutake hyphae by aseptically replacing the liquid nutrient medium containing the growth-induced Matsutake hyphae with a liquid nutrient medium containing no carbon source; and culturing aseptically the inoculum of the Matsutake hyphae in a culture substrate containing a surfactant and/or a natural vegetable oil as an active principle.

(8) A method of forming an artificial Shiro of Matsutake, comprising:

inducing growth of Matsutake hyphae by aseptically homogenizing a colony of Matsutake hyphae and aseptically culturing the obtained hyphae in a liquid nutrient medium;

preparing an inoculum of Matsutake hyphae by aseptically replacing the liquid nutrient medium containing the growth-induced Matsutake hyphae with a liquid nutrient medium containing no carbon source; and culturing aseptically the inoculum of the Matsutake hyphae in a culture substrate containing a fatty acid ester as an active principle.

(9) The method of forming an artificial Shiro of Matsutake according to any one of (1) to (8), wherein a solution containing the active principle at the concentration of 0.2 to 10 wt % is used as the active principle.

(10) The method of forming an artificial Shiro of Matsutake according to any one of (1) to (9), wherein a solution containing the active principle which is prepared using an organic solvent and distilled water is used as the active principle.

(11) The method of forming an artificial Shiro of Matsutake according to any one of (1) to (10), wherein either one of soil having a grain size of 3 mm or less and an artificial substrate having a grain size of 2 mm or less is used as the culture substrate.

(12) The method of forming an artificial Shiro of Matsutake according to any one of (1) to (11), wherein the active principle is added to the culture substrate in a state of a solution containing the active principle, and weight ratio of the solution containing the active principle to the total weight is 15 to 30 wt %.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
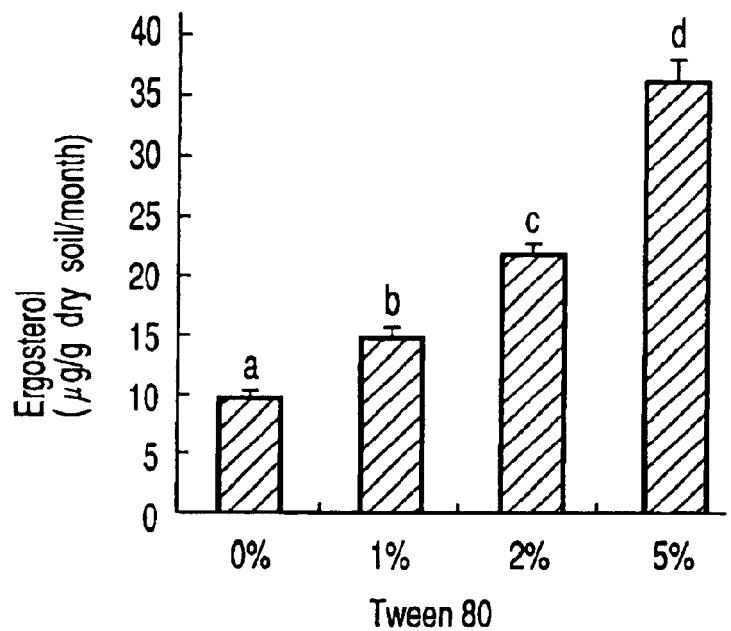
FIG. 1 is a graph showing an increase of the amount of Matsutake hyphae by the addition of Tween 80.

The method of forming an artificial Shiro of Matsutake of the present invention will be explained in detail below.

As a Matsutake strain to be used in the present invention, a commercially available strain from ATCC (American Type Culture Collection), such as ATCC 34979, ATCC 34981, and ATCC 34988 may be used. Preferably, a good strain in growth is screened from commercially available strains and it may be put to use.

The Matsutake strain can be proliferated in a medium generally used for maintaining a symbiotic. fungus in the art, such as Ohta medium (Ohta, A. (1990) Trans. Mycol. Soc. Japan 31: 323–334), MMN medium (Marx, D. H. (1969) Phytopathology 59: 153–163), and Hamada medium (Hamada (1964) Matsutake, 97–100). Of them, Ohta medium is preferable for proliferating the Matsutake strain from the viewpoint of its proliferation efficiency. Generally, the medium may be either a solid medium (e.g., agar) or a liquid medium.

Generally, the Matsutake strain is aseptically subcultured in darkness at a temperature of about 20–25° C.

In the present invention, it is possible to use hyphae of any Matsutake stock strain that is subcultured in the aforementioned medium and under the aforementioned conditions.

(Types of active principle and preparation thereof)

In one aspect of the present invention, Matsutake hyphae are cultured in a culture substrate containing a substance capable of controlling the cell membrane permeability of the hyphae as an active principle. In the present invention, the substance capable of controlling the cell membrane permeability of the hyphae is not particularly limited, as long as it enhances the cell membrane permeability of the hyphae. Several types of such a substance may be used in combination. Such a substance capable of controlling the cell membrane permeability of the hyphae is considered to facilitate release of an enzyme such as cellulose (that is present within the hyphae) from the hyphae. Preferable examples of the substance capable of controlling the cell membrane permeability of the hyphae may be a surfactant and a natural vegetable oil.

In another aspect of the present invention, Matsutake hyphae is cultured in a culture substrate containing a substance capable of enhancing the hydrophilic property of the hyphae as an active principle. In the present invention, the substance capable of enhancing the hydrophilic property of the hyphae is not particularly limited, as long as it promotes intrusion of the hyphae into the culture substrate and contributes to an increase in absorption amount of nutrient by the hyphae. Several types of such a substance may be used in combination. Preferable examples of the substance capable of enhancing the hydrophilic property of the hyphae may be a surfactant and a natural vegetable oil.

In another aspect of the present invention, Matsutake hyphae are cultured in a culture substrate containing a surfactant and/or a natural vegetable oil as an active principle. Either the surfactant or the natural vegetable oil may be contained as an active principle, or alternatively, the both may be contained. In the present invention, as long as a substance falls under the category of the surfactant or the natural vegetable oil, it can be used as the active principle of the present invention even if it does not necessarily control the cell membrane permeability of the hyphae. Similarly, in the present invention, as long as a substance falls under the category of the surfactant or the natural vegetable oil, it can be used as the active principle of the present invention even if it does not necessarily enhance the hydrophilic property of the hyphae.

The surfactant to be used in the present invention is not particularly limited, as long as it is called as a surfactant. Preferably a nonionic surfactant may be used, and more preferably a Tween series surfactant such as Tween 80 and Tween 40 may be used. Several types of surfactants may be used in combination.

The natural vegetable oil to be used in the present invention is not particularly limited, as long as it is called as a natural vegetable oil. For example, olive oil, safflower oil, or grape-seed oil may be used. Several types of natural vegetable oils may be used in combination.

The active principle preferably used in the present invention may be also expressed as fatty acid esters, according to another concept. In one aspect of the present invention, Matsutake hyphae are cultured in a culture substrate containing a fatty acid ester as an active principle. In the present invention, the fatty acid ester is preferably a higher fatty acid ester, more preferably a fatty acid ester having a fatty acid of 12–18 carbon atoms, further preferably, an unsaturated fatty acid ester having a fatty acid of 12–18 carbon atoms, and still preferably, oleic acid ester. For example, a fat and oil containing the aforementioned preferable fatty acid may be used as the active principle. Several types of fatty acid esters may be used in combination as the active principle. Also, the fatty acid ester may be used in combination with a substance other than the fatty acid ester, the substance being capable of controlling the cell membrane permeability of the hyphae. The fatty acid ester may be used in combination with a substance other than the fatty acid ester, the substance being capable of enhancing the hydrophilic property of the hyphae.

The fact that the fatty acid ester can be used as the active principle in the present invention is considered to be closely related to the facts that the aforementioned fatty acid ester is contained in some of the surfactants and the natural vegetable oils. Therefore, if a substance falls under the category of the fatty acid ester and the substance is contained in the surfactant or the natural vegetable oil, naturally it can be used as the active principle in the present invention.

The aforementioned active principle is preferably added to a culture substrate in a state of a solution containing the active principle. The solution containing the active principle such as the substance capable of controlling the cell membrane permeability of the hyphae (e.g., a surfactant and/or a natural vegetable oil) is preferably prepared by diluting it with an organic solvent (preferably ethanol) and distilled water to a desired concentration before being added to a culture substrate. A solution containing the substance capable of controlling the cell membrane permeability of the hyphae is preferably prepared by diluting it to a concentration of 0.2 to 10 wt %. Similarly, a solution containing the substance capable of enhancing the hydrophilic property of the hyphae is preferably prepared by diluting it to a concentration of 0.2 to 10 wt %.

More specifically, when a surfactant is used as the active principle, the dilution concentration of the surfactant is generally 0.2 wt % or more, preferably 0.2 to 10 wt %, and more preferably 1 to 5 wt %. The dilution concentration of less than 0.2 wt % is not preferable for the reason that the remarkable effect of the surfactant on growth of the hyphae cannot be brought about.

When a natural vegetable oil is used as the active principle, the dilution concentration of the natural vegetable oil is generally 0.2 wt % or more, preferably 0.2 to 5 wt %, and more preferably 0.5 to 2 wt %. Similarly, the dilution concentration of less than. 0.2 wt % is not preferable for the reason that the remarkable effect of the natural vegetable oil on growth of the hyphae cannot be brought about.

In the case where the surfactant and the natural vegetable oil are used together as the active principle, the dilution concentration is set at generally 0.2 wt % or more, preferably 0.2 to 10 wt %, and more preferably 0.5 to 5 wt %, in total.

When a fatty acid ester is used as the active principle, the dilution concentration of the fatty acid ester is generally 0.2 wt % or more, preferably 0.2 to 10 wt %, and more preferably 0.5 to 5 wt %.

The solution containing the active principle is preferably prepared by diluting it as follows. The active principle such as the substance capable of controlling the cell membrane permeability of the hyphae (e.g., a surfactant and/or a natural vegetable oil) is dissolved in an organic solvent (preferably ethanol), and the resultant solution is stirred for 5 to 10 minutes to obtain a homogeneous solution. Thereafter, distilled water is added to the homogenous solution to obtain a solution containing the active principle at a desired concentration. The final concentration of the organic solvent is set at generally 0.2 to 5 wt %, preferably about 2 wt %. The organic solvent for use in preparing the solution is not particularly limited, as long as it does not negatively affect the growth of Matsutake hyphae. Ethanol is preferably used. For example, a solution containing 1 wt % Tween 80 can be prepared by mixing 1 g of Tween 80 (commercially available) with 2 mL of 99.5% ethanol and then adding 98 mL of distilled water thereto. In this manner, it is possible to prepare a solution containing an active principle such as a surfactant and/or a natural vegetable oil homogenously (hereinafter also referred to as "a prepared solution containing an active principle").

(Preparation of culture substrate)

A culture substrate for adding the aforementioned active principle (such as a substance capable of controlling the cell membrane permeability of Matsutake hyphae) is not particularly limited, as long as Matsutake hyphae can grow therein. Both soil collected from a natural environment and an artificial substrate (for example, soil and vermiculite at a ratio of 1:1) may be used as the culture substrate. In Examples of the present invention, black soil was used, which contains a loamy layer of the Kanto Plain as a base.

Such a culture substrate is preferably sifted through a sieve to render the grain size of the substrate small and uniform. The grain size of the soil is adjusted preferably to about 3 mm or less, and more specifically about 2 to 3 mm. In the case of the artificial substrate, the grain size is preferably adjusted to about 2 mm or less, and more specifically about 1 to 2 mm.

The culture substrate that is made uniform in grain size as described above can be dried by dry heat. The dry heat is sufficient if it is performed at about 60° C. for about 20–30 hours as an example.

To the dried culture substrate, the aforementioned active principle is added. Preferably, to the dried culture substrate, the prepared solution containing an active principle such as a surfactant and/or a natural vegetable oil at a desired concentration, is added. At this time, the prepared solution is preferably spread throughout the culture substrate such that the resultant culture substrate is not obtained in a wet state but a dry-touched state. In other words, the culture substrate is preferably prepared so as to contain the prepared solution in an amount of 15 to 30 wt % and more preferably 20 to 25 wt %, to the total weight. The active principle such as a surfactant and/or a natural vegetable oil is added to the culture substrate, and then it is sterilized and used as the culture substrate for Matsutake hyphae. The sterilization can be performed, for example, by autoclaving it at 120° C. for 30 minutes or by γ-ray irradiation at 50–60 kGy.

The culture substrate prepared in this manner is suitable for growing Matsutake hyphae.

(Culture of Matsutake hyphae)

The culture substrate containing an active principle prepared as described above is put into a sterile container (a Petri-dish, etc.). A hypha solution containing Matsutake hyphae is inoculated into the culture substrate in the sterile container such that the hypha solution is spread throughout the culture substrate. Culture of Matsutake hyphae can be performed at 25±1° C. in the dark. After 1 to 3 month's culture of Matsutake hyphae, a piece of the grown hyphae (i.e., a Shiro) are taken as a sample, and the growth amount of the hyphae is determined based on the amount of ergosterol. Ergosterol can be quantified as follows. After a sample of a Shiro is freeze-dried (EYELA, FDU-830), 1 g of the sample is taken and extracted with 2.5 mL of ethanol (99.5%). The obtained extract is loaded into HPLC (high-performance liquid chromatography; HITACHI, Column L-7300; UV Detector L-7400; Autosampler L-7200; Pump L-7100; Integrator D-7500) to quantify the amount of ergosterol in the extract. With respect to the details of the quantification procedure, reference should be made to Martin et al. (1990) Mycol. Res. 94: 1059–1064. About one week after the initiation of the culture, it is observed that the hyphae are grown on the surface of the culture substrate. About 4 weeks after the initiation of the culture, increase in the growth amount of the hyphae is found.

As described above, when Matsutake hyphae are cultured in a culture substrate containing an active principle (e.g., a surfactant and/or a natural vegetable oil), the Matsutake hyphae grow with a remarkably larger growth amount than those cultured in a culture substrate containing no active principle. According to the artificial Shiro formation method of the present invention, it is possible to form a Shiro containing hyphae in an amount corresponding to that of a natural Shiro in a Matsutake-producing forest, in a short culture period of several months. The artificial Shiro formation method of the present invention is therefore extremely useful since it becomes a base for artificially cultivating Matsutake mushrooms.

(Preferred embodiments)

Preferred embodiments of the method of the present invention will be explained below.

An artificial Shiro of Matsutake can be induced by culturing Matsutake hyphae in a culture substrate containing the aforementioned active principle such as a substance capable of controlling the cell membrane permeability of Matsutake hyphae (e.g., a surfactant and/or a natural vegetable oil), as described above. Preferably, an inoculum of actively growing Matsutake hyphae is first prepared, and then the inoculum is cultured in a culture substrate containing the aforementioned active principle. The method of preparing an inoculum of actively growing Matsutake hyphae comprises (1) a step of inducing growth of matsutake hyphae and (2) a step of preparing an inoculum of matsutake hyphae.

These two steps will be explained below. Both of the steps are aseptically performed.

(1) Step of inducing growth of Matsutake hyphae

The step of inducing growth of Matsutake hyphae is performed by aseptically homogenizing a colony of Matsutake hyphae and aseptically culturing the obtained hyphae in a liquid nutrient medium.

In this step, as the colony of Matsutake hyphae, a colony of Matsutake hyphae which is aseptically subcultured on a solid medium (such as Ohta agar medium) may be used. Preferably, the colony (i.e., mycelia) may be prepared by taking a piece of the colony subcultured on the solid medium, inoculating it in a liquid medium having the same composition, and further culturing it at 20–25° C. in the dark for 2–3 weeks.

A piece of the aforementioned colony is taken out from the culture medium, a fresh liquid medium having the same composition is added to the colony, and it is homogenized aseptically, thereby obtaining a suspension of the hypha cells. The aseptic homogenization herein means that each hypha cell itself are not destroyed but separated from each other. For example, the aseptic homogenization can be performed in a clean bench by using a dry heat sterilized homogenizer. The colony may be homogenized with a homogenizer at about 80×100 rpm to 120×100 rpm, preferably 100×100 rpm, for about 4 to 8 seconds, preferably 6 seconds.

The suspension of the hypha cells that is obtained by the homogenization is further cultured for 3 to 5 days in the same liquid medium under the aforementioned conditions. In this manner, it is possible to obtain a suspension of actively growing Matsutake hyphae.

By homogenizing the colony as mentioned above, each of the hypha cells forming the colony is roughly separated from each other. By virtue of the separation, the Matsutake hypha cells having the capability to grow rapidly can be obtained. This is presumably because each of the separated hypha cells intakes nutrition at a higher rate from the culture medium and it hastens the apical growth of the hypha cells, compared with the hypha cells in the form of a colony.

(2) Step of preparing an inoculum of Matsutake hyphae

The step of preparing an inoculum of Matsutake hyphae is performed by aseptically replacing the liquid nutrient medium containing the growth-induced Matsutake hyphae which is obtained in the aforementioned step (1), with a liquid nutrient medium containing no carbon source.

More specifically, the preparation of the inoculum can be performed as follows. The liquid nutrient medium containing Matsutake hyphae (preferably the liquid medium containing Matsutake hyphae having the capability to grow rapidly which is obtained in the aforementioned step (1)) is first filtered, by use of a mesh such as a nylon mesh filter (average pore size 24×30 µm).

Next, the hyphae obtained by the filtration are aseptically rinsed with a liquid medium which is modified so as not to contain a carbon source (hereinafter also referred to as "a modified liquid medium"). The rinsing is preferably performed at least three times with 10 mL of the modified liquid medium. The modified liquid medium for rinsing is not limited as long as it is obtained by removing carbon source from a liquid medium capable of using for culturing the hyphae. Preferably, a modified liquid medium that is prepared by removing glucose from SH liquid medium is used (Schenk, R. U. & Hildebrandt, A. C. (1972) Can. J. Bot. 50: 199–204).

After rinsing the hyphae, an appropriate amount of the modified liquid medium is added to the hyphae, thereby obtaining an inoculum of the hyphae wherein original liquid medium is replaced with the modified liquid medium containing no carbon source.

When an artificial Shiro of Matsutake is induced using the inoculum of actively growing hyphae which is prepared by the steps (1) and (2), the advantageous effect of the present invention can be more remarkable.

EXAMPLES

The present invention will be explained in more detail by way of examples below, but the invention is not limited to these examples.

Example 1

Method of forming an artificial Shiro of Matsutake using a surfactant (Tween 80)

(1) Preparation of an inoculum of Matsutake hyphae

A piece of hyphae was taken from stock hyphae of a Matsutake strain (Tm 89; stored at the laboratory of the present inventors), and cultured on Ohta agar medium for 4 weeks. The composition of Ohta medium is shown below.

TABLE 1

Ohta medium

| Composition | Concentration (/1000 mL) |
|---|---|
| Glucose | 10 g |
| Citric acid | 1 g |
| Ammonium tartrate | 1 g |
| $KH_2PO_4$ | 1 g |
| $MgSO_4 \cdot 7H_2O$ | 1 g |
| $CaCl_2 \cdot 2H_2O$ | 50 mg |
| HEPES* | 7 g |
| Mineral solution** | 10 ml |
| Vitamin solution*** | 10 ml |
| pH | Adjusted to 5.1 with 1N KOH |

*N-2-hydroxyethylpiperazine-N'-2-ethanesulfonic acid
**Mineral solution(/1000 mL): $FeCl_3$ 5 mg, $MnSO_4 \cdot 4\text{-}6H_2O$ 50 mg, $ZnSO_4 \cdot 7H_2O$ 300 mg, $CoSO_4 \cdot 7H_2O$ 50 mg, $CuSO_4 \cdot 5H_2O$ 100 mg, $NiSO_4 \cdot 6H_2O$ 200 mg, Acetylacetone 3 mL
***Vitamin solution(/1000 mL): Thiamin hydrochloride 300 mg, Nicotinic acid 5 mg, Folic acid 3 mg, Biotin 5 mg, Pyridoxine hydrochloride 0.5 mg, Carnitine chloride 1 mg, Adenine · $H_2SO_4 \cdot 2H_2O$ 3 mg, Choline chloride 3 mg The grown hyphae were cut in a size of about 2 mm×2 mm from the agar medium, and they were cultured in fresh liquid Ohta medium for 3 weeks. A colony of the obtained hyphae was homogenized with a homogenizer and re-cultured for 3 days. After the culturing, the resultant hyphae were rinsed three times with a glucose-free liquid medium (a modified SH liquid medium), and suspended in the same glucose-free liquid medium. In this manner, an inoculum of Matsutake hyphae was prepared. The composition of the glucose-free medium is shown below.

TABLE 2

Modified SH liquid medium

| Composition | Concentration (/1000 mL) |
|---|---|
| Ammonium tartrate | 1000 mg |
| $KH_2PO_4$ | 500 mg |
| $MgSO_4 \cdot 7H_2O$ | 200 mg |
| $CaCl_2 \cdot 2H_2O$ | 20 mg |
| $FeSO_4 \cdot 7H_2O$ | 15 mg |
| $Na_2EDTA \cdot H_2O$ | 20 mg |
| $H_3BO_3$ | 0.5 mg |
| $ZnSO_4 \cdot 7H_2O$ | 0.1 mg |
| $MnSO_4 \cdot H_2O$ | 1 mg |
| $Na_2MoO_4 \cdot 2H_2O$ | 0.01 mg |
| KI | 0.1 mg |
| $CuSO_4 \cdot 5H_2O$ | 0.02 mg |
| $CoCl_2 \cdot 6H_2O$ | 0.01 mg |
| Thiamin hydrochloride | 0.5 mg |
| Nicotinic acid | 0.5 mg |
| Pyridoxine hydrochloride | 0.05 mg |
| pH | Adjusted to 5.1 with 1N NaOH |

(2) Preparation of surfactant (Tween 80) additive

Tween 80 (Polyoxyethylene (20) Sorbitan Monooleate, available from Wako Pure Chemical Industries, Ltd.) was mixed with 99.5% ethanol and stirred for 5 minutes. To the resultant mixture of Tween 80/ethanol solution, distilled water was added to prepare a Tween 80 additive. For example, 1 wt % of Tween 80 additive was prepared by adding 1 g of Tween 80 (commercially available) to 2 mL of 99.5% ethanol, followed by adding 98 mL of distilled water. The final concentration of ethanol resulted in about 2 wt %.

(3) Preparation of soil for culturing Matsutake hyphae

Soil was taken from a site under a bush in the campus of the University of Tokyo. The soil was sifted through a sieve to adjust the grain size to 3 mm or less. The soil (uniform in grain size) was dried at 60° C. for 24 hours with a dry heat sterilizer. Tween 80 additive containing Tween 80 in amounts of 0 wt %, 1 wt %, 2 wt %, or 5 wt % (prepared in step (2) of Example 1) was added to the soil and mixed well. In the case of the additive containing 0 wt % Tween 80, ethanol was added in the same amount as the cases of the Tween 80 additives containing 1 wt %, 2 wt %, and 5 wt % Tween 80, and ethanol concentration was 2% in each Tween 80 additive. The soil was prepared so as to contain the Tween 80 additive in an amount of 20 wt % to the total weight, and then the soil was sterilized in an autoclave at 121° C. for 30 minutes. In this manner, the soil for culturing Matsutake hyphae was prepared.

(4) Inoculation of Matsutake hyphae

The soil for culturing (prepared in step (3) of Example 1) was put in an amount of 30 mL to a sterile Petri-dish (90 mm diameter). 5 mL of Matsutake hyphae solution (i.e., the inoculum prepared in step (1) of Example 1) was inoculated into the soil in the Petri-dish so as to spread throughout the soil. Thereafter, the Petri-dish was incubated at 25±1° C. in the dark. One month after the initiation of the incubation, the amount of ergosterol, which is a component of the cell membrane of Matsutake hyphae, was measured to determine the amount of the hyphae (Martin et al. (1990) Mycol. Res. 94: 1059–1064). The amount of ergosterol indicates the amount of Matsutake hyphae. The measurement of the amount of ergosterol was performed by collecting soil (1 g) from each sample, extracting ergosterol therefrom, and quantifying. As the control, soil was taken from a natural Shiro in a Matsutake-producing forest (Ina, Nagano prefecture, October, 2000) and subjected to the same measurement. From the measurement results of ergosterol (FIG. 1), it is found that growth of Matsutake hyphae is significantly enhanced by the addition of Tween 80. On the other hand, the ergosterol amount in the natural Shiro derived from the Matsutake-producing forest (Ina) was 59.68 µg/g dry soil.

Example 2

Method of forming an artificial Shiro of Matsutake using natural vegetable oil (olive oil)

(1) Preparation of an inoculum of Matsutake hyphae

Preparation of an inoculum of Matsutake hyphae was performed in the same manner as described in the step (1) of Example 1, except that Tm2 (stored in the laboratory of the inventors) was used as the Matsutake strain.

(2) Preparation of natural vegetable oil (olive oil) additive

Olive oil (Ajinomoto Co. Inc.) was mixed with 99.5% ethanol, and stirred for 5 minutes. To the resultant mixture of olive oil/ethanol solution, distilled water was added to prepare an olive oil additive. For example, an additive containing 1 wt % olive oil was prepared by mixing 1 g of olive oil (commercially available) and 2 mL of 99.5% ethanol, followed by adding 98 mL of distilled water. The final concentration of ethanol resulted in about 2 wt %.

(3) Preparation of soil for culturing Matsutake hyphae

Preparation of soil for culturing Matsutake hyphae was performed in the same manner as described in the step (3) of Example 1, except that olive oil additive containing olive oil at amounts of 0%, 1%, or 2% (prepared in step (2) of Example 2) was added to the soil for culturing.

(4) Inoculation of Matsutake hyphae

Figure 2:
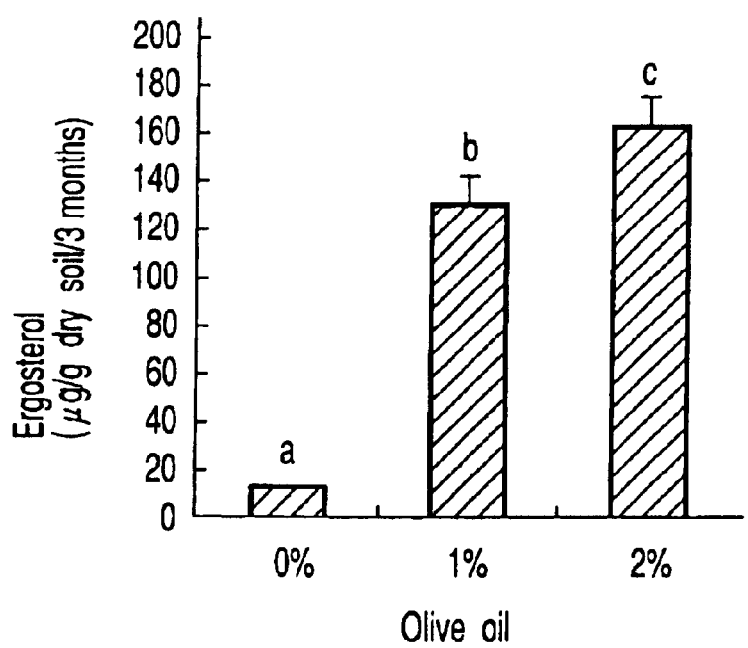
FIG. 2 is a graph showing an increase of the amount of Matsutake hyphae by the addition of olive oil.

The soil for culturing (prepared in step (3) of Example 2) was put in an amount of 30 mL to a sterile Petri-dish (90 mm diameter). 5 mL of Matsutake hyphae solution (i.e., the inoculum prepared in step (1) of Example 2) was inoculated into the soil in the Petri-dish so as to spread throughout the soil. Thereafter, the Petri-dish was incubated at 25±1° C. in the dark. Three months after the initiation of the incubation, the amount of ergosterol, which is a component of the cell membrane of the Matsutake hyphae, was measured to determine the amount of the hyphae (Martin et al. (1990) Mycol. Res. 94: 1059–1064). The measurement of the amount of ergosterol was performed by collecting soil (1 g) from each sample, extracting ergosterol therefrom, and quantifying. As the control, soil was taken from a natural Shiro in a Matsutake-producing forest (Ina, Nagano prefecture, October, 2000) and subjected to the same measurement. From the measurement results of ergosterol (FIG. 2), it is found that the growth of Matsutake hyphae is significantly enhanced by the addition of olive oil. On the other hand, the amount of ergosterol in the natural Shiro derived from the Matsutake-producing forest (Ina) was 59.68 $\mu$g/g dry soil. The ergosterol amount in the artificial Shiro obtained after 3 month's incubation is increased by the addition of olive oil to a level nearly equivalent to that in the natural Shiro derived from the Matsutake-producing forest.

(Advantages of the Invention)

At present, artificial cultivation of Matsutake mushrooms has not yet been achieved.

The advantage of the present invention resides in that the growth of Matsutake hyphae is induced to a satisfactory level by adding an active principle(s), such as a substance capable of controlling the cell membrane permeability of the hyphae and/or a substance capable of enhancing the hydrophilic property of the hyphae, to a culture substrate such as sterile soil or an artificial substrate, without using other nutritional elements. The method of the preset invention is superior in forming the Matsutake Shiro containing the hyphae in an amount equivalent to that of a naturally occurring Shiro in a Matsutake-producing forest, in a short period.

Direct inoculation of Matsutake hyphae into a natural red pine forest can be performed by using an artificial Shiro induced by the method of the present invention. The method of rapidly forming an artificial Shiro of Matsutake of the present invention becomes a base for establishing a technique of artificial cultivation of Matsutake mushrooms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of forming an artificial Shiro of Matsutake, comprising:

the step of inducing growth of Matsutake hyphae by aseptically homogenizing a colony of Matsutake hyphae to substantially separate the hypha cells from each other without destroying the cells and aseptically culturing the obtained hyphae in a liquid nutrient medium containing a carbon source;

the subsequent step of preparing an inoculum of Matsutake hyphae by aseptically replacing the liquid nutrient medium containing the growth-induced Matsutake hyphae with a liquid nutrient medium containing no carbon source after said growth inducing step; and the step of culturing aseptically the prepared inoculum of the Matsutake hyphae in a culture substrate in which Matsutake hyphae can grow containing a carbon source and at least one active principle selected from the group consisting of a surfactant and a natural vegetable oil.

2. The method of forming an artificial Shiro of Matsutake according to claim 1, wherein the active principle is added to the culture substrate in a solution containing the active principle at the concentration of 0.2 to 10 wt %.

3. The method of forming an artificial Shiro of Matsutake according to claim 1, wherein the active principle is added to the culture substrate in a solution containing the active principle which is prepared using an organic solvent and distilled water.

4. The method of forming an artificial Shiro of Matsutake according to claim 1, wherein the culture substrate is either one of soil having a grain size of 3 mm or less and an artificial substrate having a grain size of 2 mm or less.

5. The method of forming an artificial Shiro of Matsutake according to claim 1, wherein the active principle is added to the culture substrate in a state of a solution containing the active principle, and weight ratio of the solution containing the active principle to the total weight is 15 to 30 wt %.

* * * * *